US010912005B2

(12) United States Patent
Lin et al.

(10) Patent No.: US 10,912,005 B2
(45) Date of Patent: Feb. 2, 2021

(54) APPARATUSES AND METHODS FOR FAST RECOVERY TO A CERTAIN RADIO ACCESS TECHNOLOGY (RAT)

(71) Applicant: MEDIATEK INC., Hsin-Chu (TW)

(72) Inventors: Chiu-Jen Lin, Hsinchu (TW); Ching-Liang Chang, Hsinchu (TW); Wei-Lun Liu, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 24 days.

(21) Appl. No.: 16/427,462

(22) Filed: May 31, 2019

(65) Prior Publication Data
US 2020/0383028 A1 Dec. 3, 2020

(51) Int. Cl.
| | |
|---|---|
| *H04W 36/32* | (2009.01) |
| *H04W 36/14* | (2009.01) |
| *H04W 72/02* | (2009.01) |
| *H04W 76/15* | (2018.01) |
| *H04W 36/16* | (2009.01) |
| *H04W 36/36* | (2009.01) |
| *H04W 72/12* | (2009.01) |

(52) U.S. Cl.
CPC ........... *H04W 36/32* (2013.01); *H04W 36/14* (2013.01); *H04W 36/165* (2013.01); *H04W 36/36* (2013.01); *H04W 72/02* (2013.01); *H04W 72/1215* (2013.01); *H04W 76/15* (2018.02)

(58) Field of Classification Search
CPC ..... H04W 36/32; H04W 76/15; H04W 36/14; H04W 36/165; H04W 36/36; H04W 72/02; H04W 72/1215
See application file for complete search history.

(56) References Cited

U.S. PATENT DOCUMENTS

| | | | |
|---|---|---|---|
| 8,175,567 B2 | 5/2012 | Hoefel et al. | |
| 9,258,838 B2 | 2/2016 | Chen et al. | |
| 2012/0258715 A1* | 10/2012 | Souissi | H04W 36/32 455/436 |

(Continued)

FOREIGN PATENT DOCUMENTS

| | | |
|---|---|---|
| CN | 102017731 A | 4/2011 |
| CN | 104955130 A | 9/2015 |

(Continued)

*Primary Examiner* — Kashif Siddiqui
(74) *Attorney, Agent, or Firm* — McClure, Qualey & Rodack, LLP (57) ABSTRACT

The mobile communication device supports a plurality of RATs and includes a first wireless transceiver, a second wireless transceiver, and a controller. The first wireless transceiver performs wireless transmission and reception to and from a first cellular network utilizing a first RAT. The second wireless transceiver obtains a non-cellular signal indicator. The controller determines whether the first RAT is a predetermined one of the plurality of RATs when the mobile communication device camps on the first cellular network, and if not, predicts whether there is a second cellular network available, which utilizes the predetermined RAT, based on the non-cellular signal indicator. In response to predicting that the second cellular network is available based on the non-cellular signal indicator, the controller further enables the mobile communication device to camp on the second cellular network via the first wireless transceiver.

18 Claims, 4 Drawing Sheets

(56) References Cited

U.S. PATENT DOCUMENTS

| | | | |
|---|---|---|---|
| 2014/0269327 A1* | 9/2014 | Fulknier | H04L 41/00 370/237 |
| 2015/0097731 A1 | 4/2015 | Russell | |
| 2020/0029297 A1* | 1/2020 | Baek | H04W 76/16 |

FOREIGN PATENT DOCUMENTS

| | | |
|---|---|---|
| EP | 2 428 071 A1 | 3/2012 |
| WO | 2010/129615 A1 | 11/2010 |
| WO | 2011/147224 A1 | 12/2011 |
| WO | 2015/158039 A1 | 10/2015 |
| WO | 2017/218179 A1 | 12/2017 |

* cited by examiner

APPARATUSES AND METHODS FOR FAST RECOVERY TO A CERTAIN RADIO ACCESS TECHNOLOGY (RAT)

BACKGROUND OF THE APPLICATION

Field of the Application

The application generally relates to mobile communications, and more particularly, to apparatuses and methods for fast recovery to a certain Radio Access Technology (RAT) among a plurality of RATs supported by a mobile communication device.

Description of the Related Art

With growing demand for ubiquitous computing and networking, various wireless technologies have been developed, including cellular technologies (also called Radio Access Technologies (RATs)) and non-cellular wireless technologies. For example, cellular technologies may include Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, Long Term Evolution-Advanced (LTE-A) technology, Time-Division LTE (TD-LTE) technology, and New Radio (NR) technology, and others. Non-cellular wireless technologies may include Wireless-Fidelity (Wi-Fi) technology, Global Positioning System (GPS) technology, Frequency Modulation (FM) technology, and Amplitude modulation (AM) technology, etc. Particularly, GSM/GPRS/EDGE technology is also called the 2G cellular technology; WCDMA/CDMA-2000/TD-SCDMA technology is also called 3G cellular technology; and LTE/LTE-A/TD-LTE technology is also called 4G cellular technology; and NR technology is also called 5G cellular technology.

Nowadays, a mobile communication device, such as a mobile phone, may support multiple RATs and even support one or more non-cellular technologies, to provide a user the flexibility of mobile communications at all times via the supported wireless technologies, regardless of his/her geographic location. Taking a mobile phone supporting a legacy cellular technology (e.g., 2G/3G cellular technology) and an advanced cellular technology (e.g., 4G) as an example, it is common that the mobile phone prefers to camp on a 4G cellular network to obtain faster and better mobile services. However, there may be situations where the 4G signal quality may not be good enough or the 4G signal may not be available. For instance, when the user carrying the mobile phone enters a signal dead zone (e.g., an elevator, tunnel, or basement), the mobile phone may reselect from a 4G cellular network to a 2G/3G cellular network due to the 2G/3G signals suffering less radio penetration loss than the 4G signals.

In such situations, the mobile phone may only reselect back to the 4G cellular network when certain criteria defined by the Third Generation Partnership Project (3GPP) specifications are met. That is, when the user carrying the mobile phone leaves the signal dead zone, the mobile phone may stay camped on the 2G/3G cellular network and may not reselect back to the 4G cellular network until measurements are performed and the measurement results meet the criteria defined by the 3GPP specifications. As a result, it may take a long time before the mobile phone can reselect back to the 4G cellular network, even though there is a 4G cellular network available with good signal quality.

BRIEF SUMMARY OF THE APPLICATION

In order to solve the aforementioned problem, the present application proposes to allow a mobile communication device (e.g., a mobile phone) to recover to a certain RAT (e.g., a preferred RAT) as soon as possible, so that faster and better mobile services may be provided to the user of the mobile communication device.

In one aspect of the application, a mobile communication device supporting a plurality of RATs is provided. The mobile communication device comprises a first wireless transceiver, a second wireless transceiver, and a controller. The first wireless transceiver is configured to perform wireless transmission and reception to and from a first cellular network utilizing a first RAT. The second wireless transceiver is configured to obtain a non-cellular signal indicator. The controller is configured to determine whether the first RAT is a predetermined one of the plurality of RATs supported by the mobile communication device when the mobile communication device camps on the first cellular network. In response to the first RAT not being the predetermined RAT, the controller is further configured to predict whether there is a second cellular network available, which utilizes the predetermined RAT, based on the non-cellular signal indicator. In response to predicting that the second cellular network is available based on the non-cellular signal indicator, the controller is further configured to enable the mobile communication device to camp on the second cellular network via the first wireless transceiver.

In another aspect of the application, a mobile communication device supporting a plurality of RATs is provided. The mobile communication device comprises a wireless transceiver and a controller. The wireless transceiver is configured to perform wireless transmission and reception to and from a first cellular network utilizing a first RAT, and obtain a non-cellular signal indicator. The controller is configured to determine whether the first RAT is a predetermined one of the plurality of RATs supported by the mobile communication device when the mobile communication device camps on the first cellular network. In response to the first RAT not being the predetermined RAT, the controller is further configured to predict whether there is a second cellular network available, which utilizes the predetermined RAT, based on the non-cellular signal indicator. In response to predicting that the second cellular network is available based on the non-cellular signal indicator, the controller is further configured to enable the mobile communication device to camp on the second cellular network via the wireless transceiver.

In yet another aspect of the application, a method for fast recovery to a certain RAT among a plurality of RATs, executed by a mobile communication device supporting the plurality of RATs, is provided. The method comprises the steps of: determining whether the a first RAT is a predetermined one of the plurality of RATs supported by the mobile communication device when the mobile communication device camps on a first cellular network utilizing the first RAT; in response to the first RAT not being the predetermined RAT, predicting whether there is a second cellular network available, which utilizes the predetermined RAT, based on a non-cellular signal indicator; and in response to predicting that the second cellular network is available based on the non-cellular signal indicator, enabling the mobile communication device to camp on the second cellular network.

Other aspects and features of the present application will become apparent to those with ordinarily skill in the art upon review of the following descriptions of specific embodiments of the mobile communication devices and the methods for fast recovery to a certain RAT.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
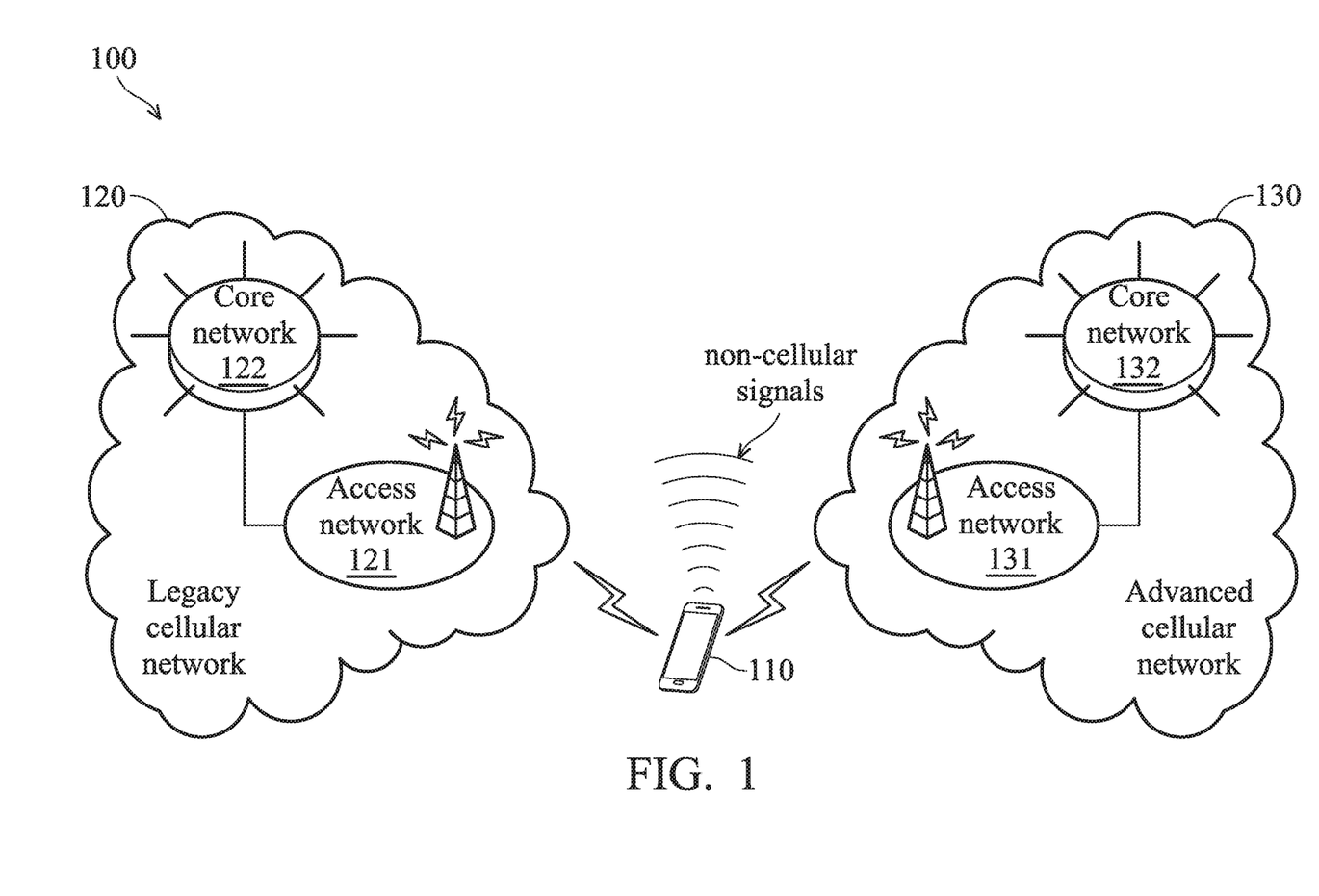
FIG. 1 is a block diagram of a wireless communication environment according to an embodiment of the application.

FIG. 1 is a block diagram of a wireless communication environment according to an embodiment of the application.

As shown in FIG. 1, the wireless communication environment 100 includes a mobile communication device 110 and two service networks 120 and 130. The mobile communication device 110 may wirelessly communicate with the service network 120 or 130 at a given time for obtaining mobile services. In addition, the mobile communication device 110 may receive non-cellular signals (e.g., Wireless-Fidelity (Wi-Fi) signals, Global Positioning System (GPS) signals, Frequency Modulation (FM) signals, or Amplitude modulation (AM) signals) and obtain indicators (e.g., signal strength/quality) of the non-cellular signals.

The mobile communication device 110 may be referred to as a User Equipment (UE) or Mobile Station (MS), such as a feature phone, a smartphone, a panel Personal Computer (PC), a laptop computer, or any computing device supporting the cellular technologies utilized by the service networks 120 and 130.

The service network 120 is a legacy cellular network, while the service network 130 is an advanced cellular network. For example, the service network 120 may be a 2G network (e.g., GSM/GPRS/EDGE/IS-95 network) or a 3G network (e.g., WCDMA/CDMA-2000/TD-SCDMA network), while the service network 130 may be a 4G network (e.g., LTE/LTE-A/TD-LTE network). Alternatively, the service network 120 may be a 2G network, while the service network 130 may be a 3G network, or the service network 120 may be a 4G network, while the service network 130 may be a 5G network (e.g., an NR network), and the present application should not be limited thereto.

Specifically, the service network 120 includes an access network 121 and a core network 122, and the service network 130 includes an access network 131 and a core network 132. Each of the access networks 121 and 131 is responsible for processing radio signals, terminating radio protocols, and connecting the mobile communication device 110 with the core network 122 or 132, while each of the core networks 122 and 132 is responsible for performing mobility management, network-side authentication, and interfaces with public/external networks (e.g., the Internet).

The access networks 121 and 131 and the core networks 122 and 132 may each include one or more network nodes for carrying out said functions. For example, if the service network 120 is a GSM/GPRS/EDGE network, the access network 121 may be a GSM EDGE Radio Access Network (GERAN) which includes at least a Base Transceiver Station (BTS) and a Base Station Controller (BSC), and the core network 122 may be a GPRS core which includes at least a Mobile Switching Center (MSC), Home Location Register (HLR), Serving GPRS Support Node (SGSN), and Gateway GPRS Support Node (GGSN).

If the service network 120 or 130 is a WCDMA network, the access network 121 or 131 may be a Universal Terrestrial Radio Access Network (UTRAN) and the core network 122 or 132 may be a General Packet Radio Service (GPRS) core which includes a Home Location Register (HLR), at least one Serving GPRS Support Node (SGSN), and at least one Gateway GPRS Support Node (GGSN).

If the service network 120 or 130 is an LTE/LTE-A/TD-LTE network, the access network 121 or 131 may be an Evolved-UTRAN (E-UTRAN) which includes at least an evolved NB (eNB) (e.g., a macro eNB, femto eNB, or pico eNB), and the core network 122 or 132 may be an Evolved Packet Core (EPC) which includes a Home Subscriber Server (HSS), Mobility Management Entity (MME), Serving Gateway (S-GW), Packet Data Network Gateway (PDN-GW or P-GW), and IP Multimedia Subsystem (IMS) server.

If the service network 130 is an NR network, the access network 131 may be a Radio Access Network (RAN) which includes at least a gNB or Transmission Reception Point (TRP), and the core network 132 may be a Next Generation Core Network (NG-CN) which includes various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

Figure 2:
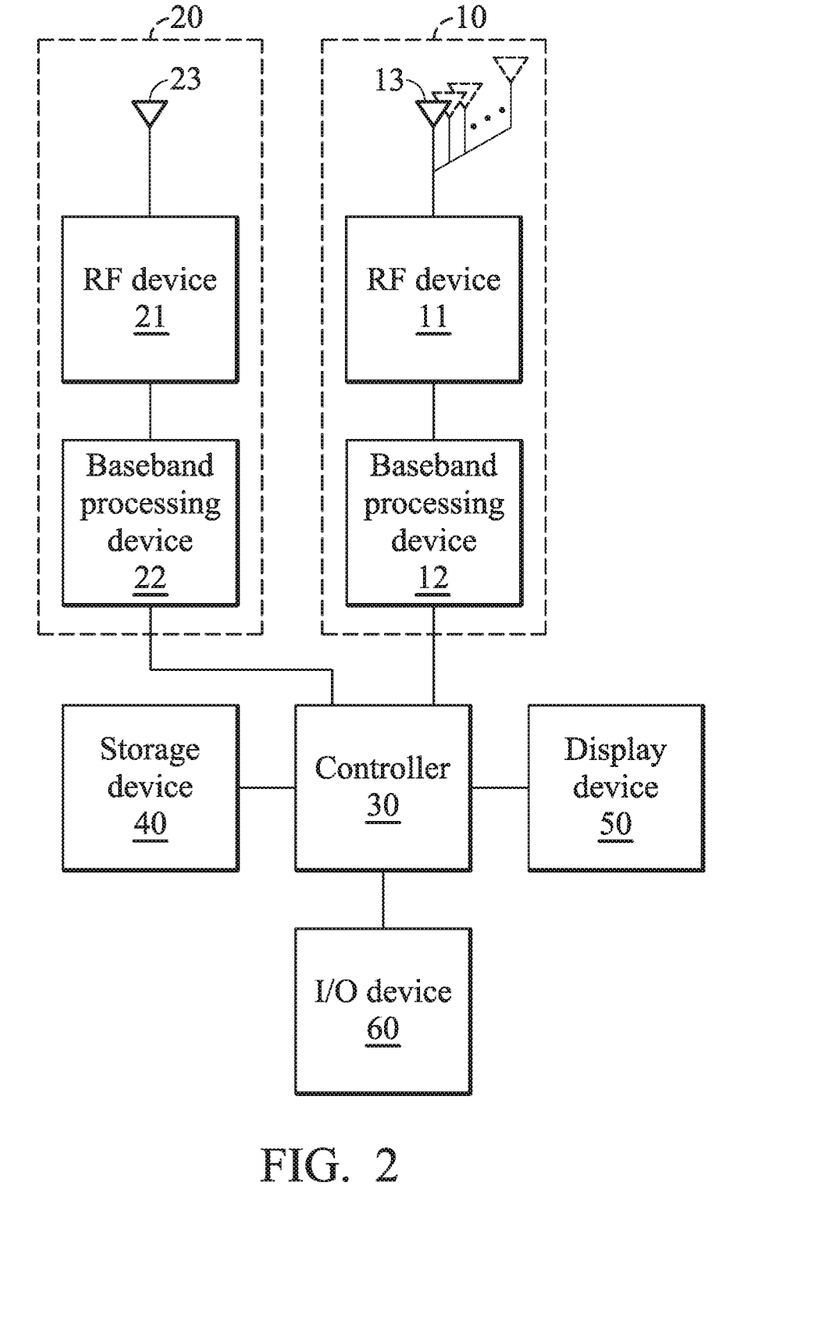
FIG. 2 is a block diagram illustrating the mobile communication device 110 according to an embodiment of the application.

FIG. 2 is a block diagram illustrating the mobile communication device 110 according to an embodiment of the application.

As shown in FIG. 2, the mobile communication device 110 may include two wireless transceivers 10 and 20, a controller 30, a storage device 40, a display device 50, and an Input/Output (I/O) device 60.

The wireless transceiver 10 is configured to perform wireless transmission and reception to and from the service networks 120 and 130.

Specifically, the wireless transceiver 10 may include a Radio Frequency (RF) device 11, a baseband processing device 12, and antenna(s) 13, wherein the antenna(s) 13 may include one or more antennas for beamforming.

The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 11 may receive RF wireless signals via the antenna(s) 13, convert the received RF wireless signals to baseband signals, which are processed by the baseband processing device 12, or receive baseband signals from the baseband processing device 12 and convert the received baseband signals to RF wireless signals, which are later transmitted via the antenna(s) 13. The RF device 11 may also contain multiple hardware devices to perform radio frequency conversion. For example, the RF device 11 may include a mixer to multiply the baseband signals with a carrier oscillated in the radio frequency of the supported RATs, wherein the radio frequency may be 900 MHz, 1800 MHz or 1900 MHz utilized in GSM/EDGE/GPRS systems, or may be 900 MHz, 1900 MHz or 2100 MHz utilized in WCDMA systems, or may be 850 MHz, 1900 MHz, or 2100 MHz utilized in IS-95/CDMA-2000/CDMA-2000 1×EV-DO systems, or may be 900 MHz, 2100 MHz, or 2.6 GHz utilized in LTE/LTE-A/TD-LTE systems, or any radio frequency (e.g., 30 GHz-300 GHz for mmWave) utilized in 5G (e.g., NR) systems, or another radio frequency, depending on the RAT in use.

The wireless transceiver 20 is configured to perform wireless reception from one or more non-cellular signal transmitters (e.g., a GPS satellite, an AM/FM broadcasting station, and/or a Wi-Fi Access Point (AP)).

Specifically, the wireless transceiver 20 may include an RF device 21, a baseband processing device 22, and an antenna 23.

The baseband processing device 22 is configured to perform baseband signal processing. The baseband processing device 22 may contain multiple hardware components to perform the baseband signal processing, including ADC)/DAC, gain adjusting, modulation/demodulation, encoding/decoding, and so on.

The RF device 21 may receive RF wireless signals via the antenna 23, convert the received RF wireless signals to baseband signals, which are processed by the baseband processing device 22, or receive baseband signals from the baseband processing device 22 and convert the received baseband signals to RF wireless signals, which are later transmitted via the antenna 23. The RF device 21 may also contain multiple hardware devices to perform radio frequency conversion. For example, the RF device 21 may include a mixer to multiply the baseband signals with a carrier oscillated in the radio frequency of the supported non-cellular wireless technologies, wherein the radio frequency may be 2.4 GHz or 5 GHz utilized in Wi-Fi systems, or may be 520-1710 kHz utilized in AM systems, or may be 87.5-108 MHz utilized in FM systems, or may be 10.23 MHz utilized in GPS, or another radio frequency, depending on the non-cellular wireless technology in use.

In another embodiment, the wireless transceiver 20 may include multiple sets of RF device, baseband processing device, and antenna, wherein each set of RF device, baseband processing device, and antenna is configured to receive a respective type of non-cellular signals. For example, a first set of RF device, baseband processing device, and antenna is configured to receive GPS signals; a second set of RF device, baseband processing device, and antenna is configured to receive AM/FM signals; and a third set of RF device, baseband processing device, and antenna is configured to receive Wi-Fi signals.

In yet another embodiment, the wireless transceivers 10 and 20 may be incorporated into a single wireless transceiver. That is, the single wireless transceiver may include a combo RF device to support wireless transceiving to and from the service networks 120 and 130, and non-cellular signal transmitter(s).

The controller 30 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communications with the service network 120, controlling the wireless transceiver 20 for obtaining non-cellular signal indicators, storing and retrieving data (e.g., program code) to and from the storage device 40, sending a series of frame data (e.g. representing text messages, graphics, images, etc.) to the display device 50, and receiving user inputs or outputting signals via the I/O device 60.

In particular, the controller 30 coordinates the aforementioned operations of the wireless transceivers 10 and 20, the storage device 40, the display device 50, and the I/O device 60 for performing the method for fast recovery to a certain RAT.

In another embodiment, the controller 30 may be incorporated into the baseband processing device 12, to serve as a baseband processor.

As will be appreciated by persons skilled in the art, the circuits of the controller 30 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 40 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data (e.g., a table of mappings between non-cellular signal indicators and cellular signal indicators), instructions, and/or program code of applications, communication protocols, and/or the method for fast recovery to a certain RAT.

The display device 50 may be a Liquid-Crystal Display (LCD), a Light-Emitting Diode (LED) display, an Organic LED (OLED) display, or an Electronic Paper Display (EPD), etc., for providing a display function. Alternatively, the display device 50 may further include one or more touch sensors disposed thereon or thereunder for sensing touches, contacts, or approximations of objects, such as fingers or styluses.

The I/O device 60 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application. For example, the mobile communication device 110 may include more components, such as a motion sensor, and a light sensor, wherein the motion sensor may be used to detect movements of the mobile communication device 110, and the light sensor may be used to detect changes of light conditions (which may imply the scene where the mobile communication device is in has changed). Alternatively, the mobile communication device 110 may include fewer components. For example, the mobile communication device 110 may not include the display device 50 and/or the I/O device 60.

Figure 3:
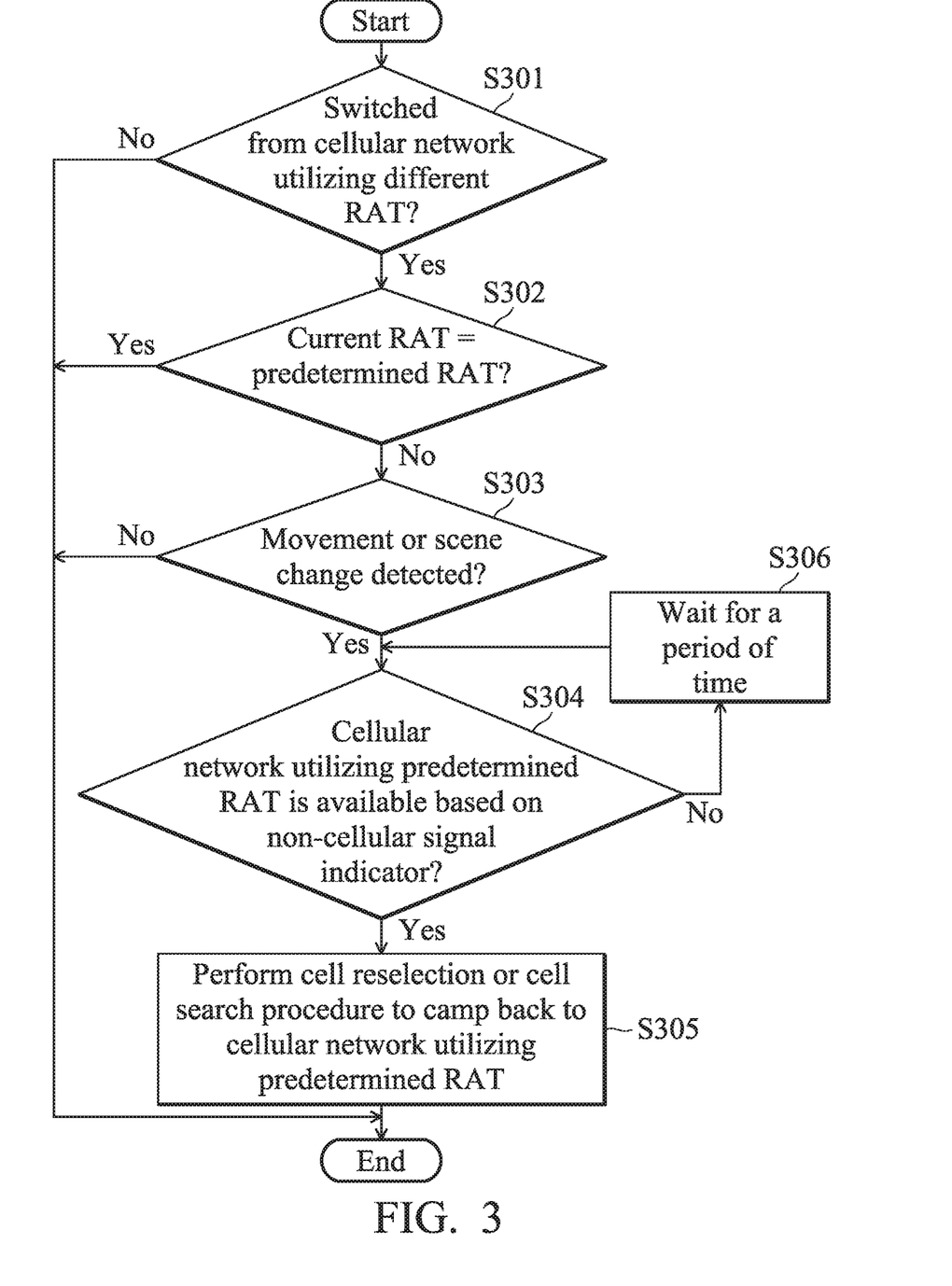
FIG. 3 is a flow chart illustrating the method for fast recovery to a certain RAT according to an embodiment of the application.

FIG. 3 is a flow chart illustrating the method for fast recovery to a certain RAT according to an embodiment of the application.

In this embodiment, the method for fast recovery to a certain RAT is applied to and executed by a mobile communication device (e.g., the mobile communication device 110) supporting a plurality of RATs.

To begin with, the mobile communication device determines whether it just switched to camp on a cellular network utilizing a first RAT from another cellular network utilizing a different RAT (step S301).

Subsequent to step S301, if the mobile communication device just switches to camp on a cellular network utilizing a first RAT from another cellular network utilizing a different RAT, the mobile communication device determines whether the first RAT is a predetermined one of the plurality of RATs supported by the mobile communication device (step S302).

In one embodiment, the predetermined RAT may be the most advanced RAT supported by the mobile communication device.

In another embodiment, the predetermined RAT may be selected by a user of the mobile communication device.

Subsequent to step S301, if the mobile communication device does not switch from another cellular network utilizing a different RAT, the method ends.

Next, subsequent to step S302, if the first RAT is not the predetermined RAT, the mobile communication device detects whether the mobile communication device has been moved or whether the scene where the mobile communication device is in has changed (step S303).

Specifically, the movement detection may be performed using a motion sensor, and the change of scene may be detected using a light sensor due to the fact that the change of light condition is highly correlated with change of scene.

Subsequent to step S302, if the first RAT is the predetermined RAT, the method ends.

Subsequent to step S303, if the mobile communication device has been moved or the scene where the mobile communication device is in has changed (i.e., implying that), the mobile communication device predicts whether there is a cellular network available, which utilizes the predetermined RAT, based on the non-cellular signal indicator (step S304).

In one embodiment, the mobile communication device may use a table of mappings between non-cellular signal indicators and cellular signal indicators of the predetermined RAT. Such a table may be established beforehand, by collecting the non-cellular signal indicators and cellular signal indicators of the predetermined RAT in a number of locations, including signal dead zones (e.g., elevator spaces, basements, and tunnels) and non-dead zones (e.g., outdoors, offices, schools, etc.)

The non-cellular signal indicators may include at least one of: the strengths/qualities of Wi-Fi signals, the strengths/qualities of GPS signals, the strengths/qualities of AM signals, and the strengths/qualities of FM signals. It should be noted that the strengths/qualities of these non-cellular signals in a location are approximately the same, and since both the non-cellular signals and cellular signals are propagated through wireless medium, they are expected to suffer similar losses in the same location. Therefore, the relations between the non-cellular signal indicators and cellular signal indicators may be used to infer the existence of cellular signals of the predetermined RAT in a location.

Each cellular signal indicator may indicate whether a cellular network utilizing the predetermined RAT is available or can be successfully pinged in a respective location.

For example, if there's a non-cellular signal indicator stored in the table, which has approximately the same value as the current non-cellular signal indicator obtained by the mobile communication device, and the cellular signal indicator corresponding to the stored non-cellular signal indicator indicates that a cellular network utilizing the predetermined RAT is available or can be successfully pinged, then it may be predicted that there is a cellular network utilizing the predetermined RAT in the current location.

Otherwise, if the cellular signal indicator corresponding to the stored non-cellular signal indicator indicates that no cellular network utilizing the predetermined RAT is available or can be successfully pinged, or if there's no non-cellular signal indicator stored in the table, which has approximately the same value as the current non-cellular signal indicator obtained by the mobile communication device, then it may be predicted that there is no cellular network utilizing the predetermined RAT in the current location.

Subsequent to step S303, if the mobile communication device has not been moved and the scene where the mobile communication device is in has not changed, the method ends.

Subsequent to step S304, if it is predicted that a cellular network utilizing the predetermined RAT is available, the mobile communication device performs a cell reselection procedure or a cell search procedure, so as to enable the mobile communication device to camp on the cellular network utilizing the predetermined RAT (step S305), and the method ends.

Subsequent to step S304, if it is predicted that no cellular network utilizing the predetermined RAT is available, the mobile communication device waits for a period of time (step S306), and the method returns to step S304.

Figure 4:
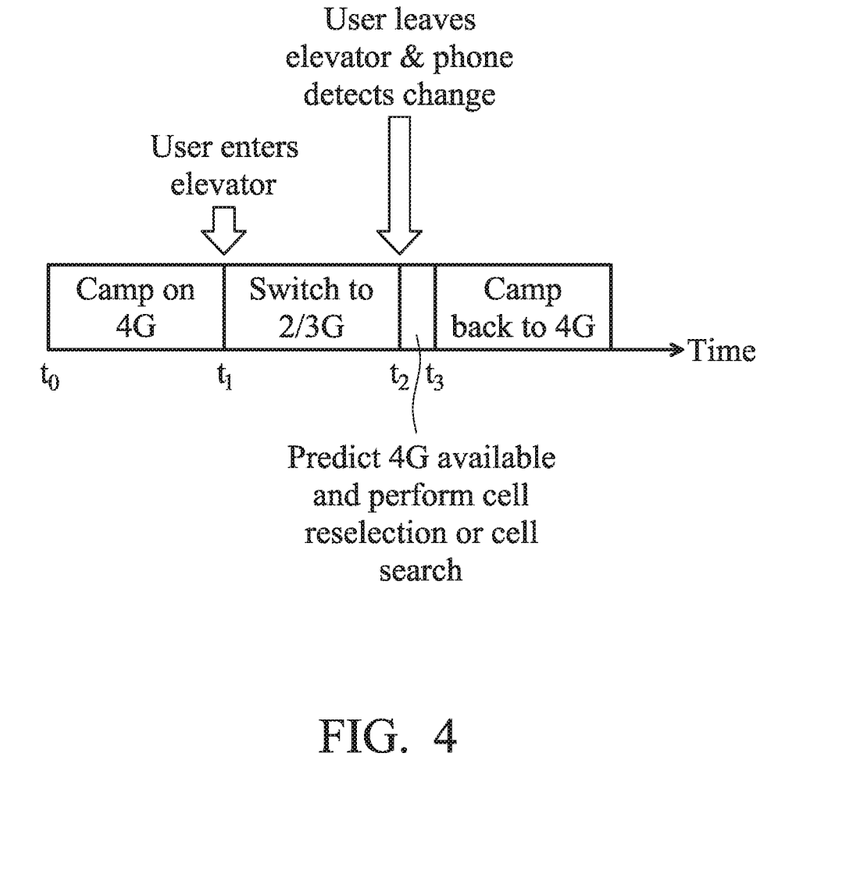
FIG. 4 is a schematic diagram illustrating fast recovery of a mobile communication device to a certain RAT according to an embodiment of the application.

FIG. 4 is a schematic diagram illustrating fast recovery of a mobile communication device to a certain RAT according to an embodiment of the application.

As shown in FIG. 4, the mobile communication device first camps on a 4G cellular network.

At time t1, the user carrying the mobile communication device enters an elevator, and since then, the mobile communication device switches to camp on a 2G/3G cellular network due to the signal strength/quality of the 4G cellular network not being good enough in the elevator.

At time t2, the user carrying the mobile communication device leaves the elevator, and movement of the mobile communication device is detected or change of scene is detected by the motion sensor or light sensor built in the mobile communication device. In response, the mobile communication device predicts whether there is a 4G cellular network available based on the currently obtained non-cellular signal indicator. In this embodiment, it is assumed that the prediction result indicates that a 4G cellular network is available, so the mobile communication device performs a cell reselection procedure or a cell search procedure.

After that, at time t3, upon successful completion of the cell reselection procedure or the cell search procedure, the mobile communication device camps back to the 4G cellular network.

In view of the forgoing embodiments, it will be appreciated that the present application allows a mobile communication device (e.g., a UE or MS) to recover to a certain RAT (e.g., a preferred RAT) as soon as possible, without passively waiting until the criteria defined by the 3GPP specifications are met. Advantageously, faster and better mobile services may be provided to the user of the mobile communication device, thereby improving user experience.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A mobile communication device, supporting a plurality of Radio Access Technologies (RATs), comprising:
    a first wireless transceiver, configured to perform wireless transmission and reception to and from a first cellular network utilizing a first RAT;
    a second wireless transceiver, configured to obtain a non-cellular signal indicator; and
    a controller, configured to:
    determine whether the first RAT is a predetermined one of the plurality of RATs supported by the mobile communication device when the mobile communication device camps on the first cellular network,
    in response to the first RAT not being the predetermined RAT, predict whether there is a second cellular network available, which utilizes the predetermined RAT, based on the non-cellular signal indicator, and
    in response to predicting that the second cellular network is available based on the non-cellular signal indicator, enable the mobile communication device to camp on the second cellular network via the first wireless transceiver,
    wherein the non-cellular signal indicator comprises at least one of:
        a first signal strength or quality of a Wireless-Fidelity (Wi-Fi) signal;
        a second signal strength or quality of a Global Positioning System (GPS) signal;
        a third signal strength or quality of a Frequency Modulation (FM) signal; and
        a fourth signal strength or quality of an Amplitude modulation (AM) signal.

2. The mobile communication device of claim 1, wherein the predetermined RAT is the most advanced RAT supported by the mobile communication device, or is selected by a user of the mobile communication device.

3. The mobile communication device of claim 1, wherein the determination of whether the first RAT is the predetermined RAT is performed in response to the mobile communication device switching to camp on the first cellular network from another cellular network utilizing a different RAT.

4. The mobile communication device of claim 1, wherein the prediction of whether the second cellular network is available based on the non-cellular signal indicator is performed using a table of mappings between non-cellular signal indicators and cellular signal indicators of the second cellular network.

5. The mobile communication device of claim 1, wherein the controller is further configured to perform a cell reselection procedure or a cell search procedure via the first wireless transceiver in response to predicting that the second cellular network is available based on the non-cellular signal indicator, so as to enable the mobile communication device to camp on the second cellular network.

6. The mobile communication device of claim 1, further comprising:
    at least one of a motion sensor and a light sensor;
    wherein the controller is further configured to use the motion sensor to detect whether the mobile communication device has been moved, or use the light sensor to detect whether a scene where the mobile communication device is in has changed; and
    wherein the prediction of whether the second cellular network is available based on the non-cellular signal indicator is performed in response to detecting that the mobile communication device has been moved or the scene where the mobile communication device is in has changed.

7. The mobile communication device of claim 4, wherein each of the cellular signal indicators of the second cellular network indicates whether the second cellular network is suitable to be camped on or whether the second cellular network is successfully pinged in a respective location.

8. A mobile communication device, supporting a plurality of Radio Access Technologies (RATs), comprising:
    a wireless transceiver, configured to perform wireless transmission and reception to and from a first cellular network utilizing a first RAT, and obtain a non-cellular signal indicator; and
    a controller, configured to:
    determine whether the first RAT is a predetermined one of the plurality of RATs supported by the mobile communication device when the mobile communication device camps on the first cellular network,
    in response to the first RAT not being the predetermined RAT, predict whether there is a second cellular network available, which utilizes the predetermined RAT, based on the non-cellular signal indicator, and
    in response to predicting that the second cellular network is available based on the non-cellular signal indicator, enable the mobile communication device to camp on the second cellular network via the wireless transceiver, wherein the non-cellular signal indicator comprises at least one of:
a first signal strength or quality of a Wireless-Fidelity (Wi-Fi) signal;
a second signal strength or quality of a Global Positioning System (GPS) signal;
a third signal strength or quality of a Frequency Modulation (FM) signal; and
a fourth signal strength or quality of an Amplitude modulation (AM) signal.

9. The mobile communication device of claim 8, wherein the predetermined RAT is the most advanced RAT supported by the mobile communication device, or is selected by a user of the mobile communication device.

10. The mobile communication device of claim 8, wherein the determination of whether the first RAT is the predetermined RAT is performed in response to the mobile communication device switching to camp on the first cellular network from another cellular network utilizing a different RAT.

11. The mobile communication device of claim 8, wherein the prediction of whether the second cellular network is available based on the non-cellular signal indicator is performed using a table of mappings between non-cellular signal indicators and cellular signal indicators of the second cellular network.

12. A method for fast recovery to a certain Radio Access Technology (RAT) among a plurality of RATs, executed by a mobile communication device supporting the plurality of RATs, the method comprising:
determining whether the a first RAT is a predetermined one of the plurality of RATs supported by the mobile communication device when the mobile communication device camps on a first cellular network utilizing the first RAT;
in response to the first RAT not being the predetermined RAT, predicting whether there is a second cellular network available, which utilizes the predetermined RAT, based on a non-cellular signal indicator; and
in response to predicting that the second cellular network is available based on the non-cellular signal indicator, enabling the mobile communication device to camp on the second cellular network,
wherein the non-cellular signal indicator comprises at least one of:
a first signal strength or quality of a Wireless-Fidelity (Wi-Fi) signal;
a second signal strength or quality of a Global Positioning System (GPS) signal;
a third signal strength or quality of a Frequency Modulation (FM) signal; and
a fourth signal strength or quality of an Amplitude modulation (AM) signal.

13. The method of claim 12, wherein the predetermined RAT is the most advanced RAT supported by the mobile communication device, or is selected by a user of the mobile communication device.

14. The method of claim 12, wherein the determination of whether the first RAT is the predetermined RAT is performed in response to the mobile communication device switching to camp on the first cellular network from another cellular network utilizing a different RAT.

15. The method of claim 12, wherein the prediction of whether the second cellular network is available based on the non-cellular signal indicator is performed using a table of mappings between non-cellular signal indicators and cellular signal indicators of the second cellular network.

16. The method of claim 12, further comprising:
performing a cell reselection procedure or a cell search procedure in response to predicting that the second cellular network is available based on the non-cellular signal indicator, so as to enable the mobile communication device to camp on the second cellular network.

17. The method of claim 12, wherein the mobile communication device comprises at least one of a motion sensor and a light sensor, and the method further comprises:
using the motion sensor to detect whether the mobile communication device has been moved, or using the light sensor to detect whether a scene where the mobile communication device is in has changed;
wherein the prediction of whether the second cellular network is available based on the non-cellular signal indicator is performed in response to detecting that the mobile communication device has been moved or the scene where the mobile communication device is in has changed.

18. The method of claim 15, wherein each of the cellular signal indicators of the second cellular network indicates whether the second cellular network is suitable to be camped on or whether the second cellular network is successfully pinged in a respective location.

* * * * *